United States Patent
Kalluri et al.

[11] Patent Number: 6,052,746
[45] Date of Patent: Apr. 18, 2000

[54] INTEGRATED CIRCUIT HAVING PROGRAMMABLE PULL DEVICE CONFIGURED TO ENABLE/DISABLE FIRST FUNCTION IN FAVOR OF SECOND FUNCTION ACCORDING TO PREDETERMINED SCHEME BEFORE/ AFTER RESET

[75] Inventors: Seshagiri Prasad Kalluri; Rene M. Delgado; James B. Eifert, all of Austin, Tex.

[73] Assignee: Motorola, Inc., Schaumburg, Ill.

[21] Appl. No.: 09/059,818

[22] Filed: Apr. 14, 1998

[51] Int. Cl.[7] .................................................. G06F 13/00
[52] U.S. Cl. .................... 710/38; 710/7; 710/11; 710/14; 710/31; 365/194; 365/200
[58] Field of Search .................... 710/11, 14, 38, 710/118, 7, 31; 711/170; 365/194, 200

[56] References Cited

U.S. PATENT DOCUMENTS

| | | | |
|---|---|---|---|
| Re. 34,363 | 8/1993 | Freeman | 326/40 |
| 4,349,870 | 9/1982 | Shaw et al. | 364/232.8 |
| 4,680,487 | 7/1987 | Kobayashi | 326/17 |
| 5,146,565 | 9/1992 | Blanck et al. | 364/228.2 |
| 5,226,010 | 7/1993 | Glider et al. | 365/230.01 |
| 5,237,221 | 8/1993 | Posse | 326/87 |
| 5,379,382 | 1/1995 | Work et al. | 710/63 |
| 5,396,639 | 3/1995 | Suenaga et al. | 364/231 |
| 5,596,765 | 1/1997 | Baum et al. | 364/238 |
| 5,752,077 | 5/1998 | Yiu et al. | 710/7 |
| 5,841,707 | 11/1998 | Cline et al. | 365/194 |
| 5,889,710 | 3/1999 | Pascucci | 365/200 |
| 5,900,021 | 5/1999 | Tiede et al. | 711/170 |
| 5,915,080 | 6/1999 | Park | 714/6 |
| 5,969,543 | 10/1999 | Erickson et al. | 326/83 |

OTHER PUBLICATIONS

Motorola Inc., 1990, MC68340 Integrated Processor User's Manual, pp. 4–14—4–16, Section 4.2.4.2 "Global Chip–Select Operation".

Intel 8051 Handbook, Document No.: Unknown, Country: Japan, Translation: No, Name:FIG. 3–6 from Intel 8051 Handbook, p. 47.

*Primary Examiner*—Thomas C. Lee
*Assistant Examiner*—Tammara Peyton

[57] ABSTRACT

Method and apparatus for selectively enabling a pull device coupled to a multiplexed terminal connector based on the function of the terminal connector. When the terminal functions as a general purpose input/output (GPIO), the pull device is enabled on reset or on setting a control bit. For operation as a data port, the pull device is disabled, and on reset the pull device is enabled only after any pending data transaction has completed. Upon completion of the reset period the pull device is again disabled for data port operation. In one embodiment, a terminal has a first interruptible function and a second uninterruptible function. The terminal is coupled to a pull device and control logic. If the second function is active, the control logic enables the pull device with a time delay sufficient that the second function is completed prior to the enabling of the pull device.

23 Claims, 5 Drawing Sheets

INTEGRATED CIRCUIT HAVING PROGRAMMABLE PULL DEVICE CONFIGURED TO ENABLE/DISABLE FIRST FUNCTION IN FAVOR OF SECOND FUNCTION ACCORDING TO PREDETERMINED SCHEME BEFORE/ AFTER RESET

REFERENCE TO RELATED CO-PENDING APPLICATION

The present application for patent is related to the following co-pening application:

"Data Processing System Having a Multifunction Input/Output Port with Individual Pull-up and Pull-down Control" by Hing L. Yiu, et al., filed on May 15, 1995, having application Ser. No. 8,440,948 and assigned to the assignee hereof.

FIELD OF THE INVENTION

The present invention relates generally to semiconductors, and specifically to pull device enable on multiplexed output ports.

BACKGROUND

An integrated circuit typically includes a variety of terminal connectors or pads. Some pads are designated for data communication with devices such as memory, while other pads are dedicated for input/output communication with modules, peripherals, and other devices. Often, as the complexity of the chip increases the need to use a single pad for multiple functions becomes advantageous. Pads used for multiple functions are typically multiplexed and a path selector determines an internal communication path based on function. The function of each terminal connector is then programmably specified by the user. In this way, the size of the integrated circuit is not greatly impacted, while the flexibility of the device to meet the needs of different users is increased.

Often terminal connectors, or ports, incorporate pull devices to maintain an output level or a high impedance level when the pad is not in use. Pull devices used to assure a certain state of the pad include pull-up devices and pull-down devices, used to maintain a high or low level output voltage respectively. The user enables or disables the pull device associated with a pad based on the functionality of that pad. For example, when a pad is used for data communication, the pad is subject to a data transfer protocol. Here the pad may be used to communicate address information, data information, and control information in a predetermined order. The combination and order of information transferred on each pad is defined by the protocol. The pull vice is disabled and should not be enabled until completion of the transaction. If the integrated circuit is reset and the pull device is enabled prior to the termination of the transaction, there may be a data coherency problem. During data communication it is important that each device receive all necessary information before the transaction terminates. It is therefore desirable to wait until the transaction is completed before effecting a change to the pull device.

For a multiplexed pad, a same pad is used as a general purpose input/output (GPIO) and as a data port. It is typically desirable to enable a pull device associated with a GPIO pad when not in use, however, the pull device is disabled for the data port. On reset, the pull device of a GPIO pad is enabled to avoid any spurious signal generation for an application. For example, in an automotive design the GPIO pads may control any number of modules within the system; after reset it is important to maintain a known state, and thus avoid providing an unintended control signal. After reset the pull device on the GPIO pad may be disabled in software. This is true, even though the pull device may be disabled for prolonged periods during operation. Any number of events may result in a reset of the circuit. Since a given pad may be configured with the pull device on or off, a problem arises on reset in determining how to configure the pull device. If the pad was used for data transaction prior to reset, a data coherency problem may exist if the pull device is enabled before the data transaction is completed.

A need exists for a method of controlling a pull device associated with a multiplexed pad, which avoids data coherency issues, while providing a flexible mechanism for pull device control. Additionally, it is desirable to have a means of preventing enablement of the pull device while the integrated circuit is in data transaction mode, such as inadvertent software operations, or simultaneous use by multiple masters.

DETAILED DESCRIPTION OF THE PREFERRED EMBODIMENT

In the following description, numerous specific details are set forth such as specific registers, etc. to provide a thorough understanding of the present invention. A signal may be represented as a single conductor or multiple conductors, used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

According to one aspect of the present invention, an integrated circuit comprises a terminal having a pull device coupled to the terminal, where the terminal has a first function and a second function, the first function being immediately effective and the second function for data transactions, and wherein if the second function is active the control logic is adapted to enable the pull device after the second function is completed.

According to another aspect of the present invention, a method of enabling a pull device first determines whether a multiplexed terminal of an integrated circuit is functioning as a data port, and if the terminal is functioning as a data port and a transaction is pending, enabling the pull device after the transaction has completed.

According to another aspect of the present invention, a method of disabling a pull device first determines whether a multiplexed terminal of an integrated circuit is functioning as an I/O port, and if the terminal is functioning as an I/O port disabling the pull device responsive to a pull enable control bit.

Figure 1:
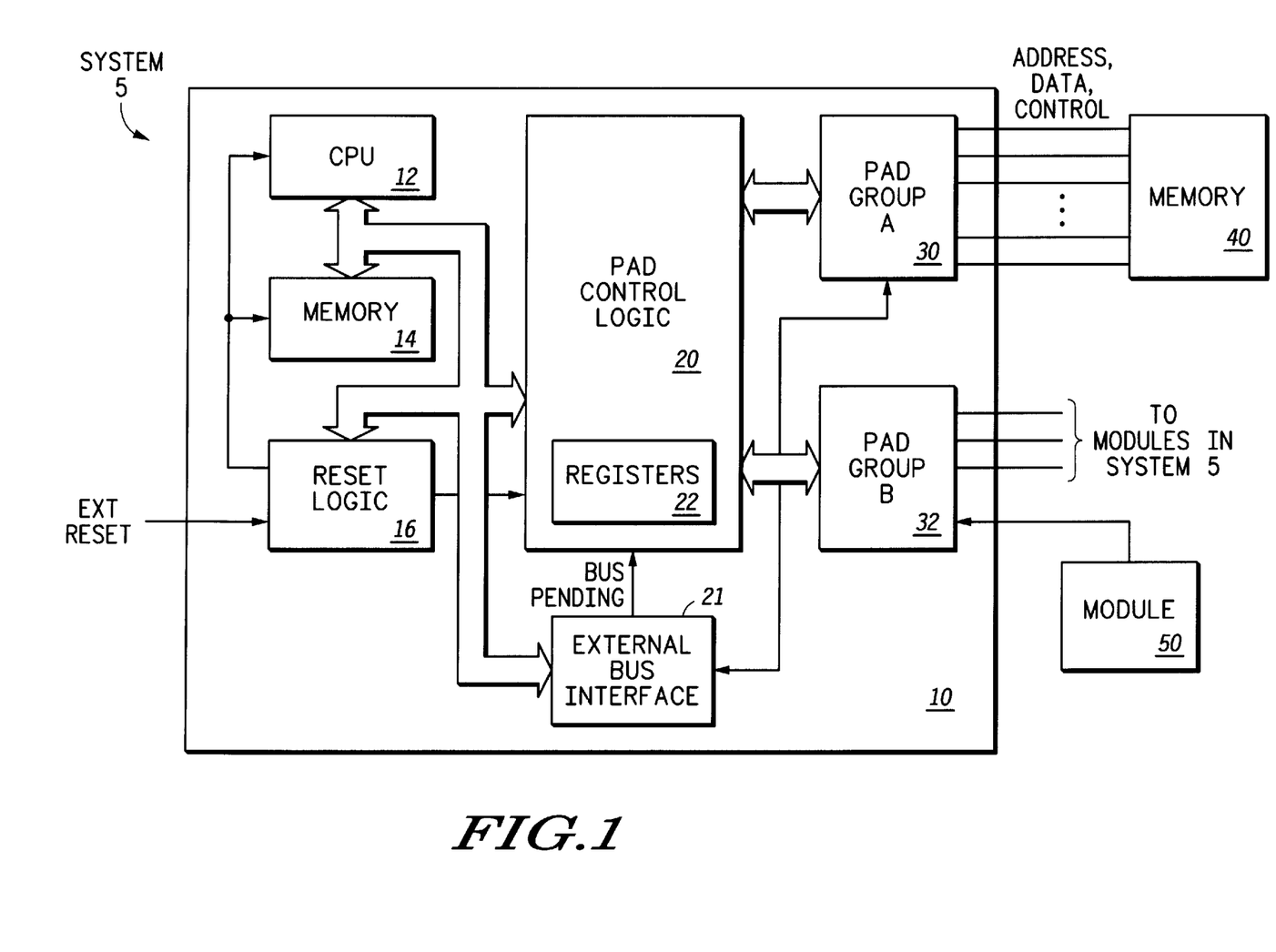
FIG. 1 illustrates, in block diagram form, a data processing system 5 according to an embodiment of the present invention.

In reference to FIG. 1, system 5 is illustrated having integrated circuit 10 coupled to memory 40, module 50, and other modules within system 5. Within integrated circuit 10, central processing unit (CPU) 12 is coupled to memory 14, reset logic 16 and an internal communication bus 13. Reset logic 16 is used to effect a reset of integrated circuit 10. Reset logic 16 is responsive to both internal reset conditions and an external reset signal. Internal resets may include timer watch dog time out as well as the computer operating properly time out. External reset may be a hard reset performed by the user, or a reset signal received from other modules within system 5. Reset logic 16 provides an output signal to pad control logic 20.

Integrated circuit 10 also includes an external bus interface unit (EBI) 21 which is coupled to communication bus 13 within integrated circuit 10, and is coupled to pad group A 30. Communication bus 13 couples the central processing unit (CPU) 12, memory 14, reset logic 16, and pad control logic 20. Pad control logic 20 includes a group of registers 22. Reset logic 16 is coupled to registers 22, and provides configuration information to pad control logic 20. The registers 22 include a pad assignment (PAR) register, a data direction register (DDR), a data register (DR) for input/output (I/O) operation, a data register for data communication and bus configuration, and a control register associated with each pad group. Pad control logic 20 uses the information stored in registers 22 to configure each of pad group A30 and pad group B32. The configuration of each pad group is according to the use of the pad group for data communication or GPIO, and includes enabling and/or disabling the pull devices associated with each pad group. Pad control logic 20 controls the configuration and operation of pad group A 30 and pad group B 32.

On reset pad control logic 20 effects the necessary control of pad group A 30 and pad group B 32 to configure them according to a predetermined scheme. The predetermined scheme may not coordinate with the operating state just prior to reset. For example, where pad group A30 is used for data communication and a reset occurs. In this case the data communication should be completed prior to configuring the pull devices associated with pad group A 30. Where pad group A 30 is used as GPIO prior to reset, the pull devices may be configured immediately on reset.

According to one embodiment of the present invention pad group A30 includes multiple connection terminals for transferring and receiving information from integrated circuit 10 and memory device 40. According to this embodiment, each terminal connector of pad group A30 is used to transmit address, data, and control information to and from memory 40. As illustrated in FIG. 1, pad group A 30 is designed for data communication with memory 40, while pad group B 32 is designed for GPIO use with module 50 and other modules within system 5. On reset, the configuration of pad group B 32 may be modified according to the reset protocol. However, pad group A 30 may have had a pending data transaction, and the configuration according to the reset protocol may result in a data transaction error. Pad control logic 20 provides an enable signal to pad group 30 to allow time for any pending data transactions to complete.

Figure 2:
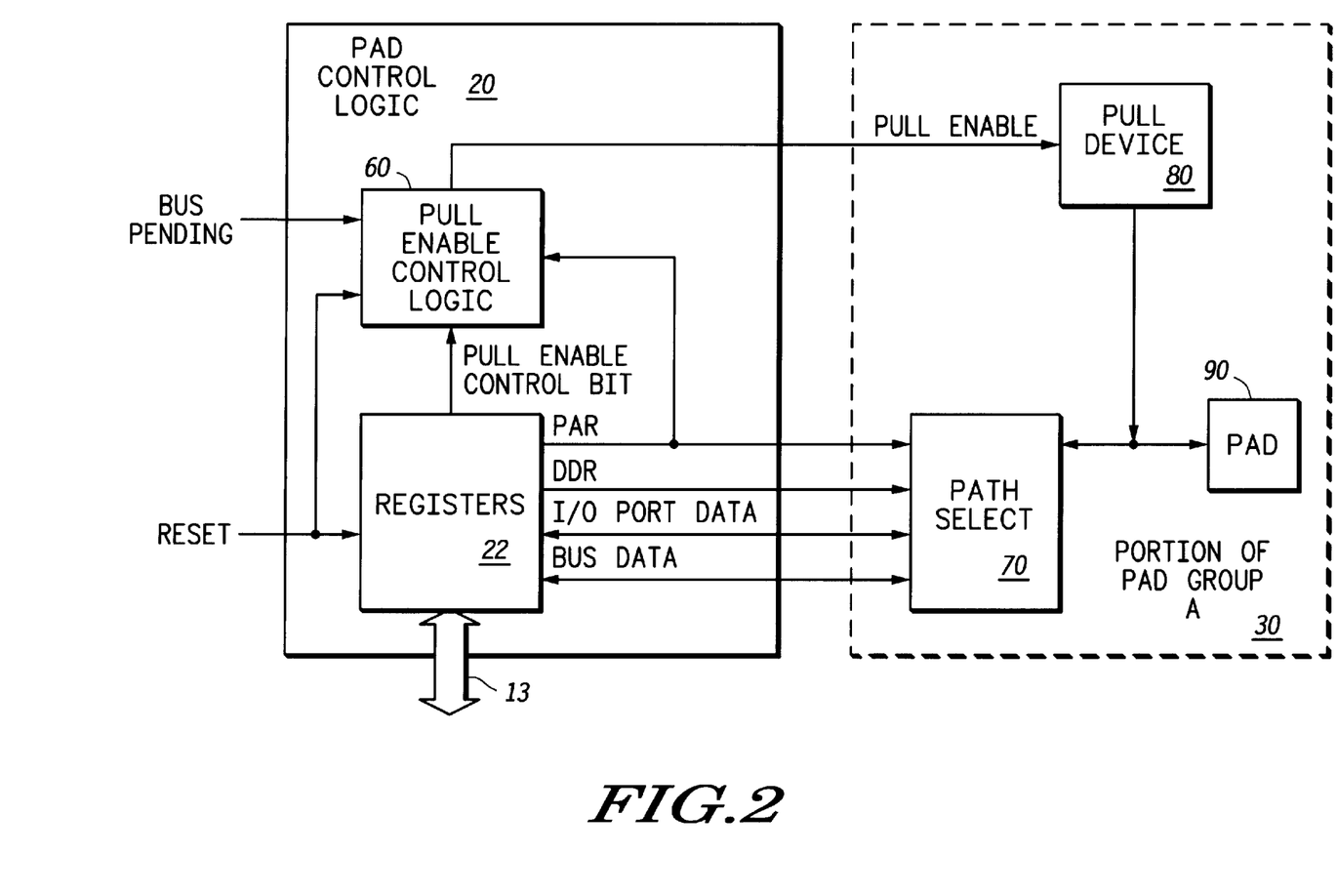
FIG. 2 illustrates, in block diagram form, pad control logic 20 and pad group A 30 from FIG. 1, according to an embodiment of the present invention.

FIG. 2 further details pad control logic 20 according to one embodiment, and pad control logic 20 interconnection with a portion of pad group A30. Pad control logic 20 includes pull enable control logic 60 and a group of registers 22. A portion of pad group A 30 includes pull device 80, path select 70, and pad 90. Pull device 80 receives a pull enable signal from pad control logic 20. Pull device 80 provides an output signal to pad 90. Path select 70 is coupled to pad control logic 20, and is bi-directionally coupted to pad 90. Information from various registers within registers 22 are coupled to path select 70. Pad control logic 20 controls the configuration and operation of pad 90 during normal operation and during reset.

Path select 70 is responsive to PAR information and DDR information to determine the direction of information flow as well as the path of information flow. For example, path select 70 of pad group A30 is used to select either I/O port data path or bus data path. In this case pad 90 is a multiplexed terminal connector, having a first mode of operation referred to as GPIO and a second mode of operation referred to as data transaction. Referring again to FIG. 1, pad group A30 is coupled to memory 40, where the information transmitted includes address, data, and control information. For this type of transmission, path select 70, of FIG. 2, will select the bus data path. Note that pad group B 32, of FIG. 1, is coupled to various modules within system 5, including module 50. For this type of operation, path select 70 of FIG. 2 will select the I/O port data path.

Pad control logic 20 receives a bus pending signal from within integrated circuit 10 of FIG. 1. The bus pending signal indicates that a transaction is pending on a pad group within integrated circuit 10 of FIG. 1. Pad control logic 20 then processes the bus pending information to determine whether to enable pull device 80. On reset pad control logic 20 will not enable pull device 80 while the bus pending signal is asserted.

Referring again to FIG. 2, pad 90 has a pull device 80 coupled between pad 90 and path select 70. Pull device 80 is used to control an output level on pad 90. When pull device 80 receives a pull enable signal from pull enable control logic 60 of pad control logic 20, pull device 80 is activated for pad 90. During normal operation of pad 90, path select 70 selects the bus data path, where pad 90 is used for data transaction to and from memory 40 of FIG. 1. Accordingly, pull device 80 is disabled during normal operation. If the reset configuration requires the pull device 80 to be enabled on reset, pad control logic 20 will not enable pull device 80 until the bus pending signal is negated. In this way, data coherency problems are avoided.

Within pad control logic 20, pull enable control logic 60 receives the bus pending signal, a reset signal, a pull enable control signal from registers 22, and a PAR signal from registers 22. Operation of pull enable control logic 60 is determined by these four signals. PAR information indicates to pull enable control logic 60 which data path is selected, i.e. indicates the function of the pad. For data transaction mode of operation pull enable control logic 60 will receive PAR information indicating the function of the pad for data communication. Pull enable control logic 60 will determine from the bus pending signal if a transaction is pending on pad 90. Pull enable control logic 60 also receives a control signal from registers 22 which is a programmable pull enable control bit. Upon receipt of the pull enable control bit, pull enable control logic 60 will try to effect enablement of pull device 80. However, upon assertion of reset if PAR information indicates that pad 90 is in a data transaction mode, i.e. path select 70 has selected a bus data path, and there is a bus transaction pending on pad 90, then pull enable control logic 60 will not be able to effect a pull device enable until the transaction has completed. Similarly when pull enable control logic 60 receives a reset signal it will wait until any pending transactions are completed before enabling pull device 80. Note that this problem does not arise if path select 70 had selected I/O port data path, where there is no need to wait for a transaction to complete.

Figure 3:
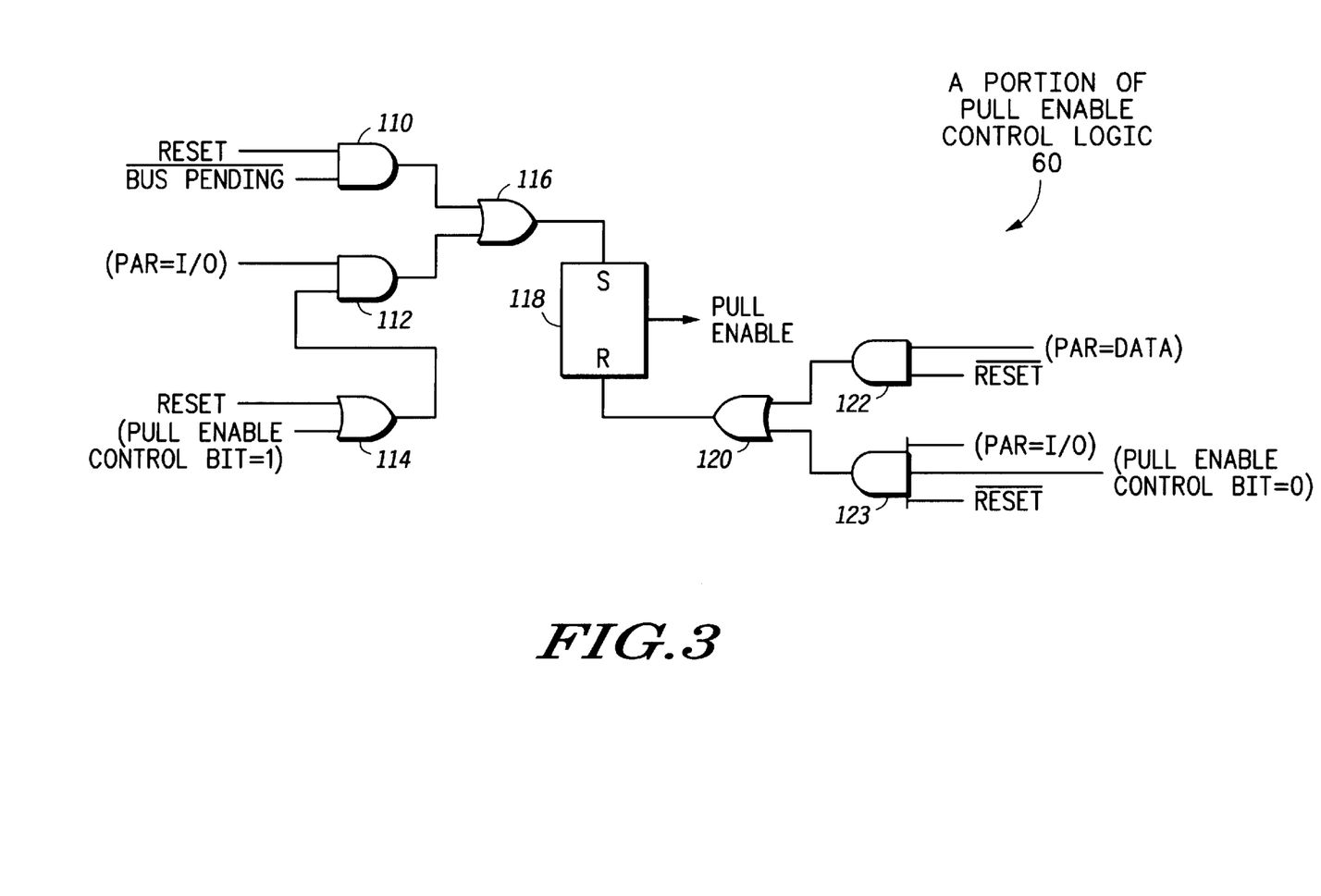
FIG. 3 illustrates, in logic diagram form, pad control logic 20 according to an embodiment of the present invention.

FIG. 3 illustrates pull enable control logic 60 according to one embodiment. Logic gate 110 receives the reset signal and the bus pending signal as inputs, and has an output coupled to gate 116. Gate 114 receives the reset signal and a pull enable control bit, and has an output coupled to an input of gate 112. Gate 112 also receives a PAR information signal, indicating data bus path or GPIO path. The output of gate 112 is coupled to a second input of gate 116. The output of gate 116 is coupled to the S input of flipflop 118. The output of gate 120 is coupled to the R input to flipflop 118. Flipflop 118 outputs the pull enable signal. Gate 122 receives the reset signal and PAR information. The output of gate 122 is coupled to an input of gate 120. Logic gate 123 receives PAR information, the pull enable control bit and the reset signal. The output of gate 123 is coupled to a second input to gate 120.

In response to assertion of the reset signal and negation of the bus pending signal logic gate 110 asserts an output to gate 116. On assertion of the output from gate 112 or gate 110, gate 116 will assert an output to flipflop 118. When the PAR information indicates GPIO data path and the output of gate 114 is asserted, gate 112 asserts an output to gate 116. Gate 114 is responsive to assertion of reset or when pull enable control bit is asserted. When PAR information indicates data transaction, and reset is negated, gate 122 asserts an output to gate 120. When PAR information indicates GP, path selection, and pull enable control bit is negated and reset is negated, gate 123 asserts an output to gate 120. When the output of gate 122 is asserted or the output of gate 123 is asserted, gate 120 asserts an output to flipflop 118. In this way, on reset the pull enable signal is asserted when there is no bus pending or when the part is configured for GPIO function. Similarly, the pull enable signal is asserted when the pad is configured for GPIO function and the pull enable control bit is asserted. The pull enable signal is negated, and flipflop 118 reset, when reset is negated and the pad is configured for data transactions. Similarly, the pull enable signal is negated when reset is negated, and the pad is configured as GPIO and the pull enable control bit is negated.

Figure 4:
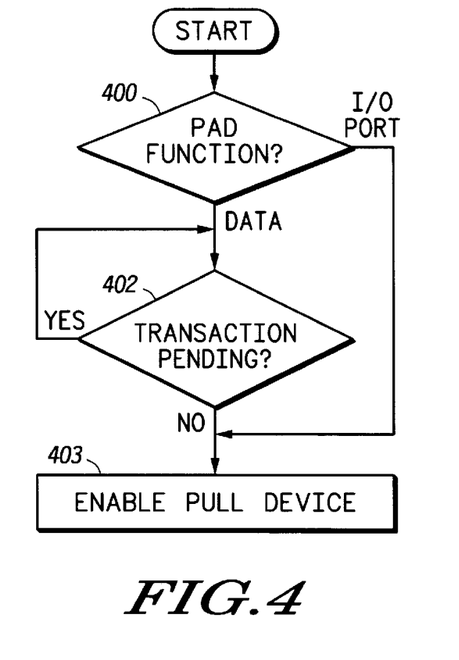
FIGS. 4 and 5 illustrate, in flow diagram form, pull device control according to an embodiment of the present invention.

FIG. 4 illustrates, in flow diagram form, operation of pull device enable control, such as effected by pull enable control logic 20. The process illustrated in FIG. 4 is initiated when reset is asserted or the pull enable control signal is asserted from registers 22. Processing flow begins at decision block 400, where pad function is determined. If the pad is configured as an I/O port, process flow continues to block 403. If the pad is configured as a data port, process flow continues to decision block 402, to determine if a transaction is pending. If no transaction is pending, process flow continues to block 403. If a transaction is pending, process flow returns to decision block 402 and transactions and loops to wait until the transaction has completed. At block 403 pull device is enabled. The method illustrated in FIG. 4 provides a means of avoiding bus contention and maintaining data coherency for a multiplexed pad.

Figure 5:
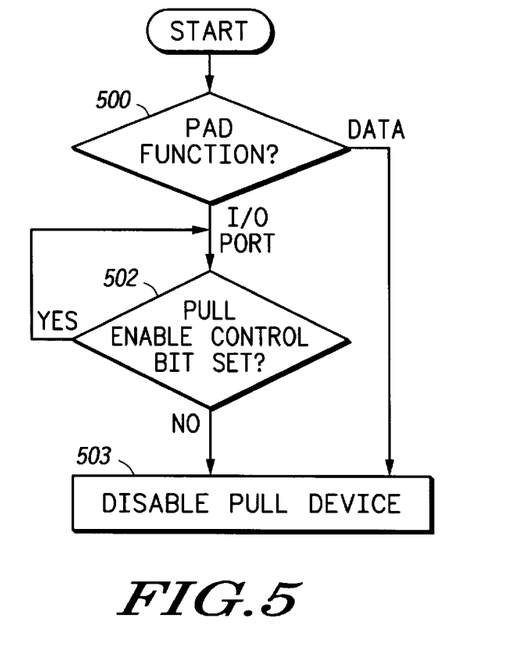

FIG. 5 illustrates pull device disable control, in flow diagram form. This flow is initiated when reset is negated or pull enable control signal from register 22 is negated. Note that the pull enable control signal from register 22 may be a single bit, multiple bits, or a signal. Here process flow begins at decision block 500 to determine the function of the pad. If the pad is configured as a data port, process flow continues to block 503. If the pad is configured as an I/O port, process flow continues to decision block 502. At decision diamond 502 it is determined if the pull device control signal from registers 22 is set. If the bit is set process flow continues again to decision block 502 to wait until the bit is reset. Once the pull enable control bit is reset process flow continues to block 503 to disable pull device.

Figure 6:
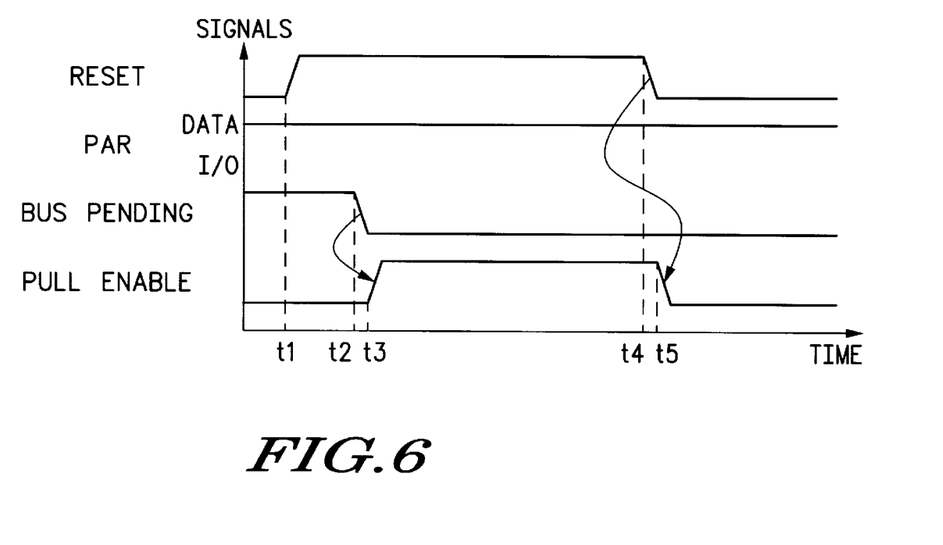
FIGS. 6–8 illustrate, in timing diagram form, operation of an embodiment of the present invention.

FIG. 6 illustrates operation of pull enable control logic 60, of FIG. 2. Here pad 90 is configured as a data port. As illustrated in FIG. 6, PAR information indicates that pad 90 is operating as a data port. The RESET signal is asserted at time $t_1$ and is negated at time $t_5$. The reset period therefore lasts from time $t_1$ to time $t_5$. Note that at time $t_1$ the BUS PENDING signal is asserted and is not negated until time $t_2$. The BUS PENDING signal is provided to pull enable control logic 60. The BUS PENDING signal is asserted at time $t_1$, and is negated at time $t_2$. Negation of the BUS PENDING signal indicates that a data transaction has completed. The PULL ENABLE signal is provided from pull enable control logic 60 to pull device 80. The PULL ENABLE signal is negated at time $t_1$, but is asserted at time $t_3$ in response to negation of the BUS PENDING signal at $t_2$. The PULL ENABLE signal is asserted until the end of the reset period. When the RESET signal is negated at time $t_4$, the PULL ENABLE signal is negated at time $t_5$ in response. Since the pad is configured as a data port, pull enable control logic 60 waits until the BUS PENDING signal is negated before enabling the PULL ENABLE signal. Note also that after completion of the reset period, PAR information continues to indicate data port operation and therefore the PULL ENABLE signal is negated. Pull device 80 is effective only for that portion of the reset period when there is no pending transaction.

Figure 7:
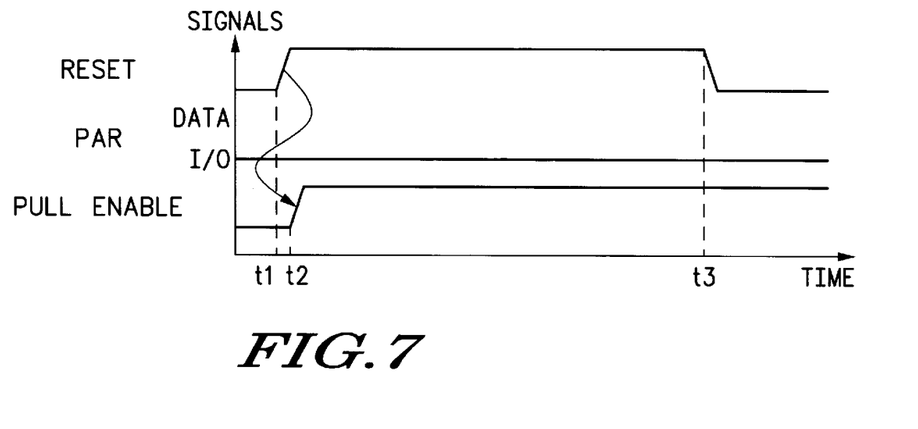
Figure 8:
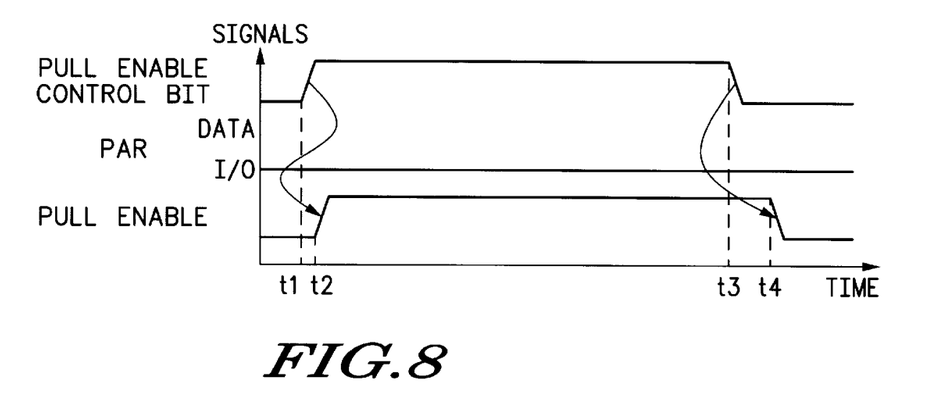

FIG. 7 illustrates the operation of pull enable control logic 60 where pad 90 is configured as an I/O port. PAR information indicates GPIO operation. RESET is asserted at time $t_1$ and negated at time $t_3$, defining the reset period. PULL ENABLE is asserted at time $t_2$ in response to assertion of RESET. When RESET is negated at time $t_3$, PULL ENABLE continues to be asserted. In this case, the pad 90 is operating as GPIO and pull device 80 is enabled. Pull device 80 is enabled throughout the reset period.

FIG. 9 illustrates operation of pull enable control logic 60 when pad 90 is configured for GPIO and pull device 80 is enabled by the pull enable control bit. The pull enable control bit is asserted at time $t_1$ and in response PULL ENABLE is asserted at time $t_2$. The PAR information indicates that pad 90 is configured as an I/O port. The pull enable control bit is negated at time $t_3$ and the PULL ENABLE signal is negated in response at time $t_4$. In this case, assertion of the pull enable control bit enables the pull device 80, where pad 90 is configured as GPIO. The pull enable control bit is effective to disable pull device 80 when negated.

Although the invention has been described and illustrated with reference to specific embodiments, it is not intended that the invention be limited to those illustrative elements. Therefore, it is intended that this invention encompass all of the variations and modifications as fall within the scope of the appended claims.

What is claimed is:

1. An integrated circuit, comprising:
   a terminal, the terminal having a first function and a second function, the first function being interruptible and the second function being not interruptible, a pull device coupled to the terminal; and control logic coupled to the pull device, the control logic being adapted to enable the pull device, wherein if the first function is active and a transaction is pending the control logic being adapted to interrupt the first function and enable the pull device, wherein if the second function is active the control logic enables the pull device with a time delay sufficient that the second function is completed prior to the enabling of the pull device.

2. The integrated circuit of claim 1, wherein the first function is a general purpose input/output port function and the second function is a data transaction function.

3. The integrated circuit of claim 2, wherein the second function is active during a read/write transaction; and wherein the second function is inactive on completion of the read/write transaction.

4. The integrated circuit of claim 1, wherein the control logic receives a reset signal and in response enables the pull device.

5. The integrated circuit of claim 1, further comprising:
an external bus interface coupled to the control logic, the external bus interface determining whether an external bus transaction is pending, the external bus interface providing a bus status signal to the control logic, the control logic ignoring the bus status signal when the first function is active.

6. The integrated circuit of claim 1, further comprising:
an assignment register coupled to the control logic;
a path selection circuit coupled to the terminal and responsive to the assignment register;
a first logic circuit, the first logic circuit implementing the first function; and
a second logic circuit, the second logic circuit implementing the second function;
wherein the first and the second logic circuits are coupled to the path selection circuit; and
wherein the assignment register stores a port assignment indicating which logic circuit is assigned to the terminal.

7. An integrated circuit, comprising:
a terminal, the terminal having a first function and a second function, the first function being a port function and the second function being a bus function;
a pull device coupled to the terminal;
at least one register for storing a pull enable control bit for controlling the pull device; and
control logic responsive to the pull enable control bit for controlling the pull device when the first function is selected, the control logic being adapted to disable the pull device, wherein when the first function is selected the control logic disables the pull device only after the pull enable control bit is negated.

8. An integrated circuit of claim 7, the control logic comprising a port assignment bit;
wherein the first function is selected by assertion of the port assignment bit; and
wherein the second function is selected by negation of the port assignment bit.

9. An integrated circuit of claim 7, wherein the control logic disables the pull device upon receipt of a negated reset signal.

10. An integrated circuit of claim 7, the control logic comprising an assignment register, and
wherein the integrated circuit further comprises:

a first logic circuit coupled to the terminal, the first logic circuit implements the first function; and
a second logic circuit coupled to the terminal, the second logic circuit implementing the second function, the first and the second logic circuit being coupled to the terminal;
wherein if the assignment register is in a first state the first logic circuit is assigned to the terminal, and if the assignment register is in a second state the second logic circuit is assigned to the terminal.

11. A data processing system, comprising:
a bus;
a memory coupled to the bus;
a transducer coupled to the bus, the transducer adapted for coupling real time signals into the data processing system; and
an integrated circuit coupled to the bus, comprising:
a terminal, the terminal having a first function and a second function, the first function being interruptible and the second function being not interruptible; and
a pull device coupled to the terminal;
wherein the control logic is adapted to enable the pull device, when the second function is active the control logic enables the pull device with a time delay sufficient for the second function to complete prior to enabling the pull device; and
wherein if the first function is active and a transaction is pending the control logic being adapted to interrupt the first function and enable the pull device.

12. A data processing system of claim 11, wherein the data processing system is a control system for an automotive application.

13. A method for enabling a pull device coupled to a terminal of an integrated circuit, the terminal having a first function and a second function, the first function being interruptible and the second function being not interruptible, the method comprising the steps of:
determining which of the first and second functions is active;
enabling the pull device with a time delay so that the second function is completed prior to the enabling of the pull device when the second function is active; and
when the first function is active interrupting the first function if a transaction is pending and enabling the pull device.

14. A method of claim 13, wherein the first function is a general purpose input/output port function and the second function is a data function.

15. A method of claim 14, wherein the data function is a read/write transaction and the second function is inactive on completion of read/write transaction.

16. A method of claim 13, wherein the step of enabling is in response to assertion of a reset signal.

17. A method of claim 13, further comprising the steps of:
determining whether an external bus transaction is pending;
issuing a corresponding bus status signal; and
ignoring the bus status signal if the first function is active.

18. A method for disabling a pull device coupled to a terminal of an integrated circuit, the terminal having a first function and a second function, the method comprising the steps of:
determining which function of the terminal is selected;
programming a time delay by setting a pull enable control register, wherein setting the pull enable control register is a precondition for disabling of the pull device; and disabling the pull device with a programmable time delay if the first function is selected.

19. A method of claim 18, wherein the first function is a general purpose input/output port function and the second function is a data function.

20. A method of claim 18, wherein the step of disabling is in response to receipt of a negated reset signal.

21. A method of claim 18, wherein the step of determining comprises reading an assignment register which is indicative of which function is active.

22. A method for controlling a pull device in an integrated circuit, the pull device coupled to a multiplexed terminal pad, the method comprising the steps of:

determining if the terminal pad is in a data communication operating mode;

initiating a reset of the integrated circuit;

determining if a data communication is pending on the terminal pad;

enabling the pull device in response to initiating reset if there is no pending data communication on the terminal pad; and delaying enablement of the pull device in response to initiating reset if there is a pending data communication on the terminal pad.

23. A method of claim 22, wherein the step of initiating a reset comprises asserting a reset signal, the method further comprising the steps of:

negating the reset signal;

disabling the pull device if the terminal pad is in a data communication operating mode; and disabling the pull device if the terminal pad is not in a data communication operating mode and a pull enable control bit is set.

* * * * *

UNITED STATES PATENT AND TRADEMARK OFFICE
CERTIFICATE OF CORRECTION

PATENT NO. : 6,052,746
DATED : April 18, 2000
INVENTOR(S) : Seshagiri Prasad Kalluri et al.

It is certified that an error appears in the above-identified patent and that said Letters Patent are hereby corrected as shown below:

On the title page item [54], insert the word "single" after *having* and before *programmable*.

Signed and Sealed this

Third Day of April, 2001

*Attest:*

NICHOLAS P. GODICI

*Attesting Officer*      *Acting Director of the United States Patent and Trademark Office*